United States Patent Office 3,337,731
Patented Aug. 22, 1967

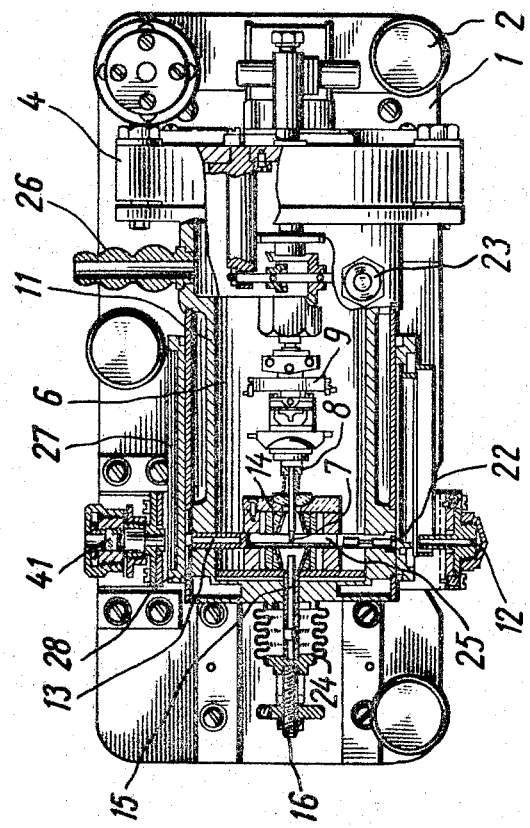

3,337,731
MULTIPLE-SHOT X-RAY THERMAL VACUUM CHAMBER FOR TESTING SAMPLES OVER A WIDE TEMPERATURE RANGE
Vasily Grigorjevich Kuznetsov, Sretensky bulvar 6/1, apt. 141; Leonid Ivanovich Tajukin, Profsoyusnaja St. 18, korp. 3, apt. 16; Viktor Petrovich Bychkov, 3rd Akademichesky proezd 15, apt. 98; Vladimir Georgievich Brodov, Frunze St. 18, apt. 8; and Julia Nikolaevna Ryurikova, Vorontsovsky per. 4, apt. 2, all of Moscow, U.S.S.R.
Filed Mar. 10, 1964, Ser. No. 350,755
1 Claim. (Cl. 250—51.5)

The present invention relates to X-ray thermal vacuum chambers to be used for testing polycrystals and monocrystals by X-ray diffraction over a wide range of temperatures.

It is known that with the view of determining by X-ray diffraction technique the crystal structure, phase transformations, and phase compositions of monocrystals or polycrystals, samples of the material under study must be cooled down, or heated to a given temperature which must then be maintained fairly rigorously for as long as the X-ray sensitive stock is exposed to the X-rays which are reflected from the sample.

To determine the thermal expansion ratio of crystal substances by radiograph methods it is necessary to carry out high-accuracy measurements of parameters of the unit cell of such substance at various temperatures, which implies precise measuring of the temperature of the sample and the effective radius of the chamber.

To make these measurements possible, X-ray thermal chambers have been proposed containing: (a) facilities for holding the sample in fixed position; (b) facilitates for heating, or cooling the sample; (c) a film holder with X-ray sensitive stock.

However, these known chambers provided no possibility for measuring temperature gradients at various points of the sample under vacuum conditions within the working chamber. Moreover, it proved difficult to ensure precise positioning of the sample to be tested, and there was no opportunity for testing the samples over a wide range of temperatures.

Moreover, the hitherto known X-ray chambers fail to give an opportunity for series of radiographs to be made at high and low temperatures with only a one-time sample setting, because of the need of refilling the X-ray sensitive stock.

In view of this, an object of the present invention is to increase the accuracy of parameter determination of the crystal cell, phase composition and phase transformations.

The invention is centered on the technical problem of creating an X-ray chamber which would make is possible to take radiographs of monocrystals over a wide range of temperatures i.e. from −269 to +1300° C., with a one-time sample setting and with no refilling of the X-ray sensitive stock.

Subsequently, the invention is made clear through a representation of drawings which are:

FIG. 2 and FIG. 3 are respectively a top view and a side view of a thermostat designed to make radiographs of mono- and polycrystals at high temperatures;

Figure 1:
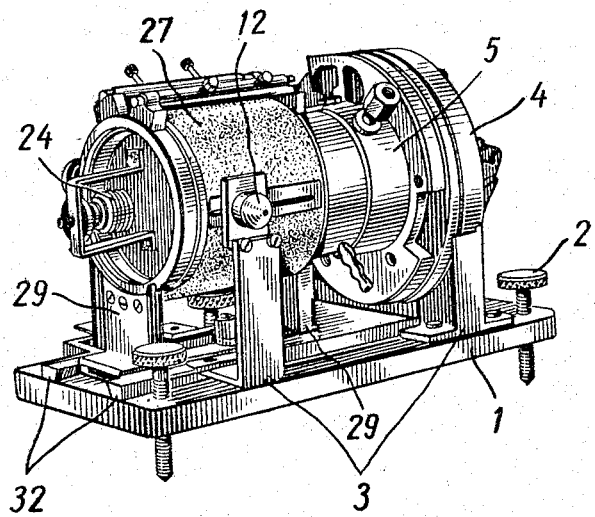
FIG. 1 is a general perspective view of the proposed multiple-shot X-ray thermal vacuum chamber.

Base plate 1 (FIG. 1), adjustable by means of screws 2, has two vertical supports 3 mounted on it.

Figure 3:
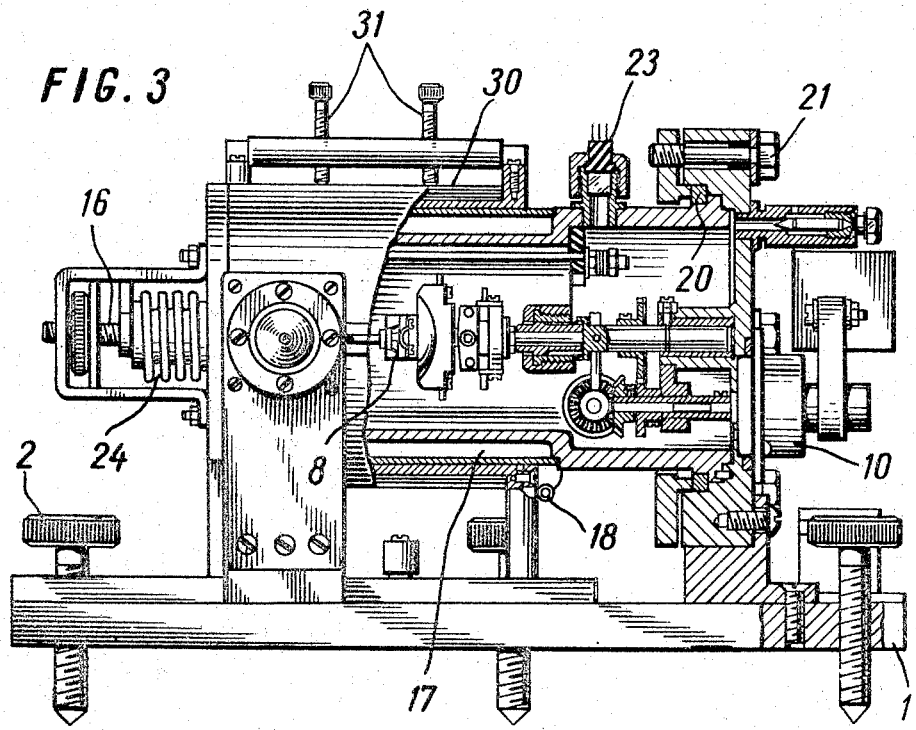

To one of supports 3 flange 4 is fixed and there is mounted thereon thermostat 5 intended for high-temperature sample testing. Inside thermostat 5 there is a working chamber 6 (FIG. 2), into which mono- or polycrystal sample 7 is placed. The sample is fixed in spring chuck 8 and is positioned in the top portion of movable goniometric head 9 which can rotate and oscillate in response to driving unit 10 (FIG. 3) which includes a motor and reducer (not shown on the drawing).

To achieve a precise optical adjustment of sample 7 under study, goniometric head 9 is decoupled from driving unit 10.

In certain instances when samples of polycrystals are to be tested, a goniometric head is used which allows for the sample to be traversed in two planes perpendicular to each other.

Thermostat 5 contains metal cylinder 11 on the wall of which is fixed the end portion of composite collimator 12 whose central axis crosses at right angle the axis of chamber 6 of thermostat 5. Through an orifice in collimator 12 an X-ray beam is projected onto the sample. To remove and absorb the primary X-rays, trap 13 is arranged in the wall of cylinder 11 coaxially with collimator 12. Heating of sample 7 in chamber 6 of thermostat 5 is achieved through two small-size bell-shaped resistance furnaces 14 having electric winding. The winding used with heating furnaces 14 for temperatures as high as up to 1000° C. is of nichrome-bearing metal wire, whereas at temperatures up to 1300° C. the wire used is of the platinum-rhodium alloy type.

At higher temperatures, when an inert medium or a vacuum is employed, tungsten or molybdenum wire will do.

The furnaces are placed so that there is a small gap of approximately 3 mm. left in between.

The temperature measurements are conducted by means of circular thermo-couple 15 (platinum-platinorhodium, chromelcopel and the like), enveloping sample 7 to be tested.

For temperature gradient measurements along the entire length of sample 7 thermocouple 15 is moved by screw control mechanism 16.

In order to cool the walls of thermostat 5 chambers 17 are provided in them, with running water being supplied thereto via nipple 18.

Figure 5:
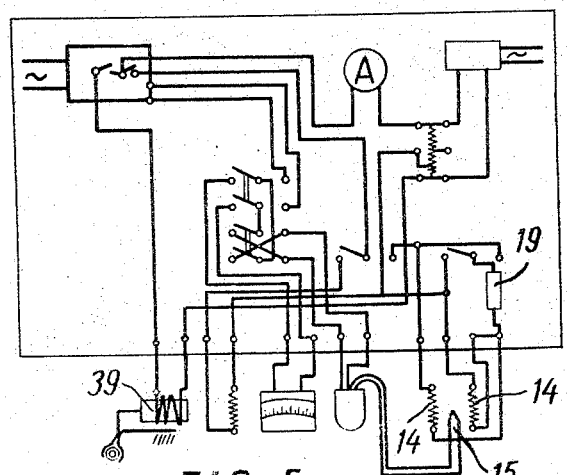
FIG. 5 is an electrical circuit diagram for controlling the chamber proposed.

The temperature compensation throughout the length of sample 7 is effected by adjusting variable shunt resistor 19 thrown into the electric circuit of chamber control (FIG. 5) of which thermo-couple 15 is also a part.

It is thus made possible to reduce the temperature variation over the length of the sample to 1° C.

Chamber 6 of thermostat 5 is hermetically sealed (FIG. 2) by means of rubber vacuum sealing 20 complete with fastening bolts 21, beryllium window 22 in the opening collimator 12, and with vacuum sealings 23 of electrical leads of the thermo-couple and heaters. Screw control mechanism 16 for thermo-couple 15 control is placed in air-tight elastic bellows 24 which is firmly secured on the body of thermostat 5.

Circular slot 25 in the wall of thermostat 5 through which the X-rays reflected from sample 7 reach the X-ray sensitized stock is sealed hermetically from the outside by a sheet of a substance which is a poor absorber of X-rays and is capable of keeping a vacuum of $10^{-6}$ mm. mc.

On the inside, slot 25 is covered with an aluminum foil which serves to screen off heat and light.

Through nipple 26 chamber 6 of thermostat 5 is connected by a hose with a vacuum pump (not shown) which pumps air out of chamber 6.

Nipple 26 can also be connected with a gas cylinder from which inert gas will be fed into the chamber. The surplus inert gas is let out via a relief valve (not shown).

Thermostat 5 is flanked by film holder 27 bearing X-ray sensitive stock (FIG. 2).

Film holder 27 comprises cylindrical body 28 mounted coaxially with thermostat 5 on two movable supports 29, and thin detachable metallic spring 30 tightly fitting the outer surface of body 28 and held in place with the aid of fixing screws 31.

The size of spring 30 is such that it safeguards from chance exposure all X-ray sensitized stock deposited in body 28 of film holder 27.

Movable supports 29 of film holder 27 can travel on guides 32 (FIG. 1) secured to base plate 1 and can be fixed in any position desired.

The movable design of film-holder 27 provides the facility for obtaining series of radiographs with one-time arrangement of the sample with no refilling of the X-ray sensitive stock.

Collimator 12, as mentioned above, is assembled of several parts which makes it possible to deposit the X-ray film both symmetrically and asymmetrically (according to Staumanis) and to increase the accuracy in determining the crystal lattice parameters at various temperatures.

Figure 4:
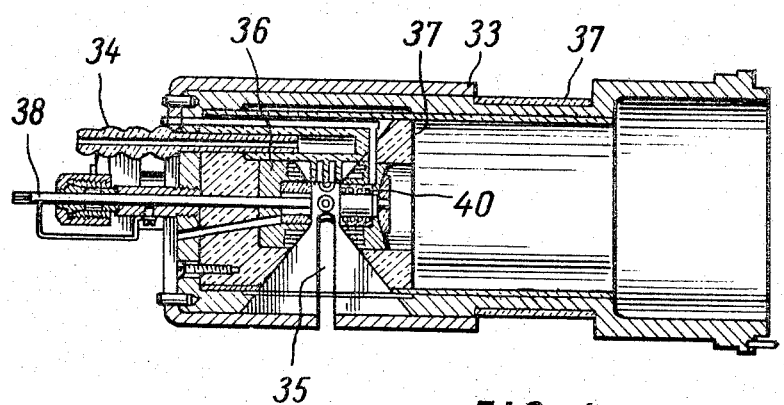
FIG. 4 is a side view of a cryostat intended for making radiographs of mono- and polycrystals at low temperatures.

To test samples at low temperatures provision has been made for cryostat 33 (FIG. 4) whose dimensions, configuration and way of mounting have been selected so that cryostat 33 is fully interchangeable with thermostat 5. The cryostat differs from the thermostat in that the former does not require hermetization of the chamber. Cooling of sample 7 in the chamber of the cryostat is done by blowing around or by sluicing over the sample liquid nitrogen or helium via nipple 34. The evolved gases are vented through slot 35 and other openings.

For temperature equilibrium in cryostat 33 there is cooling radiator 36 and heat insulation 37. The temperature of the sample is measured in the cryostat similarly as in the thermostat, i.e. by circular thermocouple 38.

For temperature control, use is made of magnetic coil 39 that is incorporated in the chamber, control circuit (FIG. 5) and modifies the feed rate of liquid nitrogen or helium.

Sample 7 can be heated in resistance furnaces 40 up to a temperature of 300° C. and then abruptly chilled in a stream of liquid nitrogen or helium right off in cryostat chamber 33 without disarranging the sample position.

To observe the position of sample 7 with respect to the X-ray beam, there is mounted on one of supports 3 a fluorescent screen with plumbeous glass 41.

At times no testing at various temperatures is required, the proposed chamber may be employed to obtain Debye-grams at room temperatures, especially in cases where the sample must be maintained in an inert medium.

The present description reflects only one special case of the embodiment of the invention; accordingly, modifications or various alterations may be made therefrom without departing from the scope of the invention.

What is claimed is:

A multiple-shot X-ray thermal vacuum chamber for testing mono- or polycrystals over a wide range of temperatures, comprising support means; means for adjusting the positions of support means; a flange fixed on the support means; driving means mounted on said flange; a goniometric head connected with the driving means and capable of rotating and oscillating in response thereto; means for securing the sample under study in the goniometric head coaxially with the same; means for protecting the goniometric head from heat radiation; a thermostat for the testing of samples, means providing an internal chamber into which said goniometric head with a sample is placed, said thermostat being fastened to said flange and including means for heating the sample in said internal chamber to a temperature in the general range of about 1000–1300° C.; movable means for measuring temperature; means for adjusting the temperature in the thermostat chamber coupled to said means for temperature measuring; means for hermetically sealing said thermostat chamber and means for setting up a non-oxidizing atmosphere in said chamber; a multiple shot movable film holder means mounted on said support means and encompassing said thermostat; X-ray sensitive stock in said film holder capable of receiving radiation reflected from the sample; means for transmitting X-ray radiation to said sample, and receiving radiation therefrom being reflected to said X-ray sensitive stock; a cryostat for testing samples at temperatures in the general range of from about the temperature of liquid nitrogen to about 300° C., provided with an internal chamber into which said goniometric head with the sample can be placed; said cryostat being interchangeable with said thermostat and including means for cooling the sample, means for heating the sample, and movable means for measuring the temperature of the sample.

References Cited

UNITED STATES PATENTS

| | | | |
|---|---|---|---|
| 2,479,471 | 8/1949 | Champaygne | 250—51.5 |
| 2,483,872 | 10/1949 | Bensen | 250—49.5 |
| 2,543,825 | 3/1951 | Beu et al. | 250—51.5 |
| 2,584,962 | 2/1952 | Gross | 250—51.5 |
| 3,089,031 | 5/1963 | Endter | 250—51.5 |
| 3,112,398 | 11/1963 | Shimula | 250—51.5 |

RALPH G. NILSON, *Primary Examiner.*

ARCHIE R. BORCHELT, *Examiner.*

A. L. BIRCH, *Assistant Examiner.*